(12) United States Patent
Bermundo

(10) Patent No.: US 10,205,846 B1
(45) Date of Patent: Feb. 12, 2019

(54) SYSTEM TO DYNAMICALLY APPLY PRINTER CONTROL PREFERENCE SETTINGS

(71) Applicant: KYOCERA Document Solutions Inc., Osaka (JP)

(72) Inventor: Neil-Paul P. Bermundo, Glendora, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/846,937

(22) Filed: Dec. 19, 2017

(51) Int. Cl.
*G06F 15/00* (2006.01)
*G06F 3/12* (2006.01)
*G06K 1/00* (2006.01)
*H04N 1/32* (2006.01)
*H04N 1/00* (2006.01)

(52) U.S. Cl.
CPC ..... *H04N 1/32106* (2013.01); *H04N 1/00344* (2013.01); *H04N 1/00482* (2013.01); *H04N 1/00506* (2013.01); *H04N 1/00511* (2013.01); *H04N 1/00514* (2013.01); *H04N 2201/0082* (2013.01); *H04N 2201/3205* (2013.01); *H04N 2201/3226* (2013.01); *H04N 2201/3242* (2013.01); *H04N 2201/3243* (2013.01)

(58) Field of Classification Search
CPC ........... H04N 1/32106; H04N 1/00344; H04N 1/00482; H04N 1/00506; H04N 1/00511; H04N 1/00514; H04N 2201/0082; H04N 2201/3205; H04N 2201/3226; H04N 2201/3242; H04N 2201/3243

USPC ....................................... 358/1.15, 1.13, 1.14
See application file for complete search history.

(56) References Cited

U.S. PATENT DOCUMENTS

| | | |
|---|---|---|
| 7,065,564 B2 | 6/2006 | Machida |
| 7,075,670 B1 | 7/2006 | Koga |
| 7,400,427 B2 | 7/2008 | Honma |
| 7,619,765 B2 | 11/2009 | Kimura et al. |
| 7,701,599 B2 | 4/2010 | Kumashio |
| 7,768,661 B2 | 8/2010 | Mitsui |
| 7,796,282 B2 | 9/2010 | Yamakawa |
| 7,872,771 B2 | 1/2011 | Kojima et al. |
| 8,390,842 B2 | 3/2013 | Shouno |
| 8,422,045 B2 | 4/2013 | Yamada |
| 2004/0051901 A1 | 3/2004 | Fukuda |
| 2004/0229606 A1* | 11/2004 | Oshima ............... H04L 63/0428 455/426.2 |
| 2007/0097448 A1 | 5/2007 | Iizuka |
| 2014/0002861 A1* | 1/2014 | Kuwahara .......... H04N 1/00233 358/1.15 |
| 2016/0371041 A1* | 12/2016 | Sato ....................... G06F 3/1239 |

* cited by examiner

*Primary Examiner* — Douglas Tran
(74) *Attorney, Agent, or Firm* — FSP LLC

(57) ABSTRACT

A printer control system correlates a user identity with a hierarchy of persistent printer control settings, and adapts the hierarchy according to stored policies by disabling changes to particular printer control settings of the hierarchy. The system forms a network response communication that includes different types of graphical user interface control settings, a first type to control the operation of a printer, and a second type to control a position of the settings to control the printer in the hierarchy of persistent printer control settings.

19 Claims, 10 Drawing Sheets

SYSTEM TO DYNAMICALLY APPLY PRINTER CONTROL PREFERENCE SETTINGS

BACKGROUND

In conventional printing systems, the printing preferences displayed when a document is printed are typically default printing preferences applicable to all documents, regardless of the type of document or other factors. Default printing preferences are associated to the account used to login in the computing device, particularly in Microsoft® Windows® systems. Similar situation apply on other computing platforms. At best, default printing preferences apply to specific users.

Every time a document needs to be printed, the same system default printing preferences are selected for the document automatically, even if user desires a different set of printing preferences for the document. The user must re-configure the printing preferences each time the document is opened, to ensure that the printer control settings he/she desires to apply for the print job are in effect.

In some work environments, a workstation is shared among several users. This may be the case for example in a laboratory, school, or anywhere there's a limited supply of computer workstations. In these environments, the login session may be shared and common for many or all users. Users share the same set of default printing preferences for the currently logged-on account. There is no mechanism in place to remember or retrieve the desired printing preferences that a particular user may desire, unless that user creates a new user login profile. The overhead of creating one's own profile on a computer system is an unnecessary inconvenience in this case. Another inconvenient alternative is to manually copy the printing preferences from one of the user's computing devices to another.

FIG. 1 illustrates a printer system 100 for Windows operating systems. The printer system 100 comprises a print subsystem 106 that includes a graphics device interface (GDI)/device driver interface (DDI) print driver 112 and an XML paper specification (XPS) print driver 114. The printer system 100 further includes default printer control settings 116 and a print setting graphical user interface (GUI) 118.

A Windows Application 102 generates an XPS doc 108 for printing on a Page Description Language (PDL) printer 122, and a Windows Presentation Foundation (WPF) Application 104 generates a Windows Enhanced Metafile (EMF) doc 110 for printing on the PDL printer 122 or on an XPS printer 120. Default printer control settings 116 for all users and documents of the print subsystem 106 are stored and presented as printing preferences, and when a document is selected for printing, the print subsystem 106 provides the default printing preferences to the Windows Application 102 and the WPF Application 104 in the print setting GUI 118 (the default printer control settings 116 may vary between the PDL printer 122 and the XPS printer 120).

In the printer system 100, when the user creates, edits and prints documents (e.g., XPS doc 108, EMF doc 110), the document-editing application (e.g., Windows Application 102, WPF Application 104) is presented with the default printing preferences for the currently set default print driver (e.g., GDI/DDI print driver 112, XPS print driver 114), or in some cases, for any print driver it finds installed in the computer system. The user must then re-configure the printing preferences as desired for the particular user, document, document type, document location, team, organization, etc. Reconfiguring the printing preferences in turn reconfigures the printer control settings that the printer system 100 applies to the current print job.

Existing solutions that enable departmental or team shared printing preferences require the designation of a specific printer for use by the department. This is usually accomplished through the installation and setting up of a print queue from a network printer (i.e., shared printer) where all users printing through the print queue are assigned common default printing preferences. Such solutions do not provide for distinguishing printing preferences among members of the department or team.

BRIEF SUMMARY

A printer control system receives an inbound communication including at least one of a user identity, a document identification, and a document type, and correlates one or more of these identifiers with a hierarchy of persistent printer control settings. The control system adapts the hierarchy of persistent printer control settings according to stored policies by disabling changes to particular printer control settings of the hierarchy. The system organizes and communicates a response to the inbound communication that includes a first type of graphical user interface control settings to control operation of a printer associated with the hierarchy of persistent printer control settings, and a second type of the graphical user interface control settings to control a level of the first type of settings in the hierarchy of persistent printer control settings.

A printer control method includes receiving a first inbound communication including one or more of a user identity, a document identification, and a document type at a network interface, and disabling changes to particular printer control settings of a hierarchy of stored printer control settings corresponding to one or more of the user identity, the document identification, and the document type, according to stored policies. A network response communication to the first inbound communication is organized and communicated, that includes types of graphical user interface control settings. A first type of the graphical user interface control settings are settings to control operation of a printer associated with the hierarchy of stored printer control settings, and a second type of the graphical user interface control settings control a level of the first type of settings in the hierarchy of stored printer control settings.

A non-transitory machine-readable storage medium for controlling a printer includes instructions that when executed by a machine processor, cause the machine processor to associate a hierarchy of persistent printer control settings with one or more of a user identity, a document identification, and a document type, and disable changes to particular printer control settings of the hierarchy of persistent printer control settings according to stored policies. The processor further organizes graphical user interface control settings into an outbound network communication in response to receiving an inbound network communication that includes one or more of the user identity, the document identification, and the document type, wherein a first type of the graphical user interface control settings are settings to control operation of a printer associated with the hierarchy of persistent printer control settings, and a second type of the graphical user interface control settings control a level of the first type of settings in the hierarchy of persistent printer control settings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Herein, "printer control settings" refer to control signals to affect the operation of printer devices, which are devices that transform electronic representations of documents into representations on physical media such as paper, or which convert one document type to another (e.g., Microsoft Word® to Adobe® PDF) via operation of user interface for printer control and configuration. "Printing preferences" refers to printer control settings particular to identified users, groups, documents, document types and other categories.

Embodiments of a print system are disclosed responsive to printer control settings in pre-configurable, assignable hierarchy levels. The system improves the utilization of resources such as ink, toner, paper, and other media types. The system utilizes policies to match the needs of particular people, teams, departments, and other categories. The system includes an improved print service and centralized logic for the assignment and maintenance of printing preferences and hence printer control settings for the control of printers, particular to individuals, teams, departments, and other categories.

The system enables printing preferences to be transferable with and associated with the user regardless of machine or hardware components that the user operates to print a document. The printing preferences are also transferable with documents and document types, and other preference categories, in a similar way.

The system maps printing preferences to specific documents, document types, users, teams, departments, offices, companies, locations, and other grouping or categories. The mapping of printing preferences is recorded and made available for re-use in different environments where the user works or wherever the documents are accessed.

Figure 1:
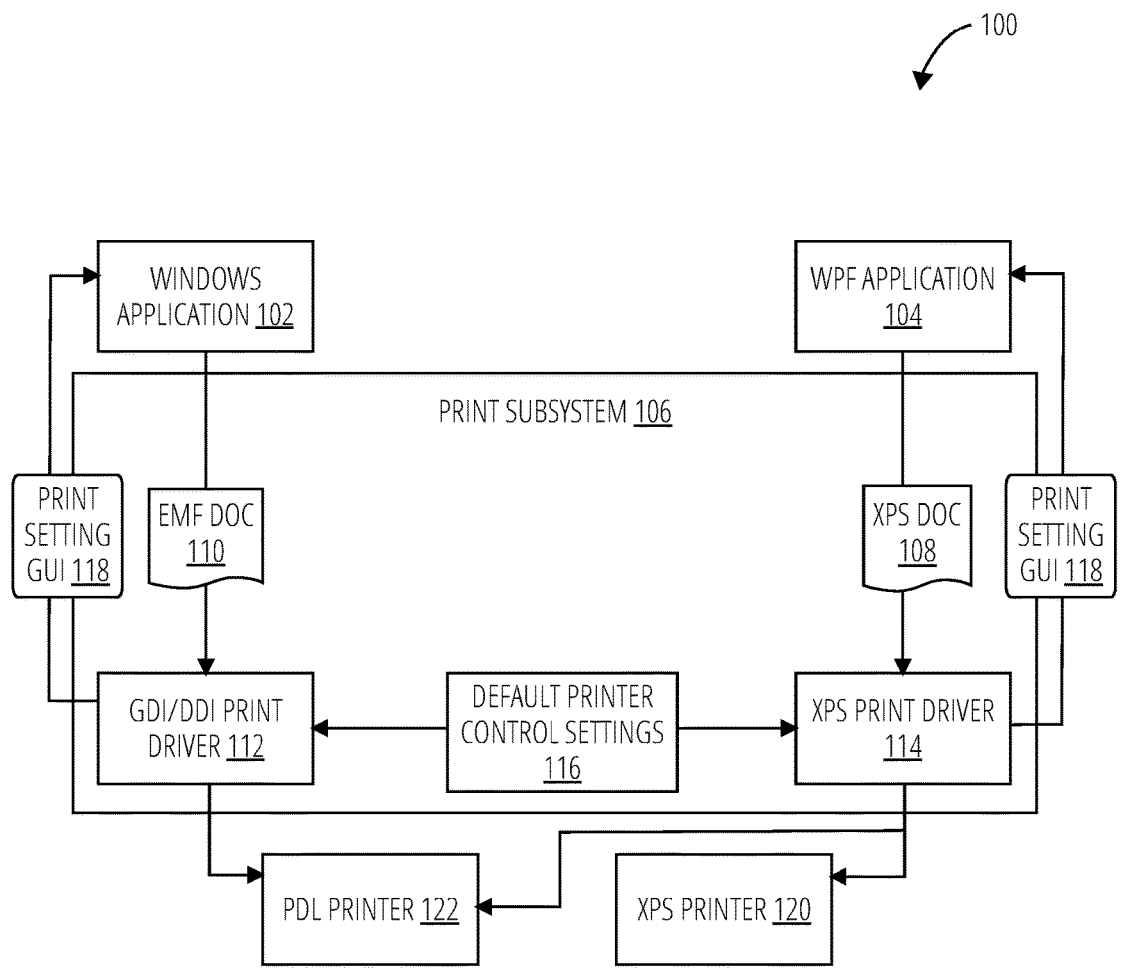
FIG. 1 illustrates a printer system 100.
Figure 2:
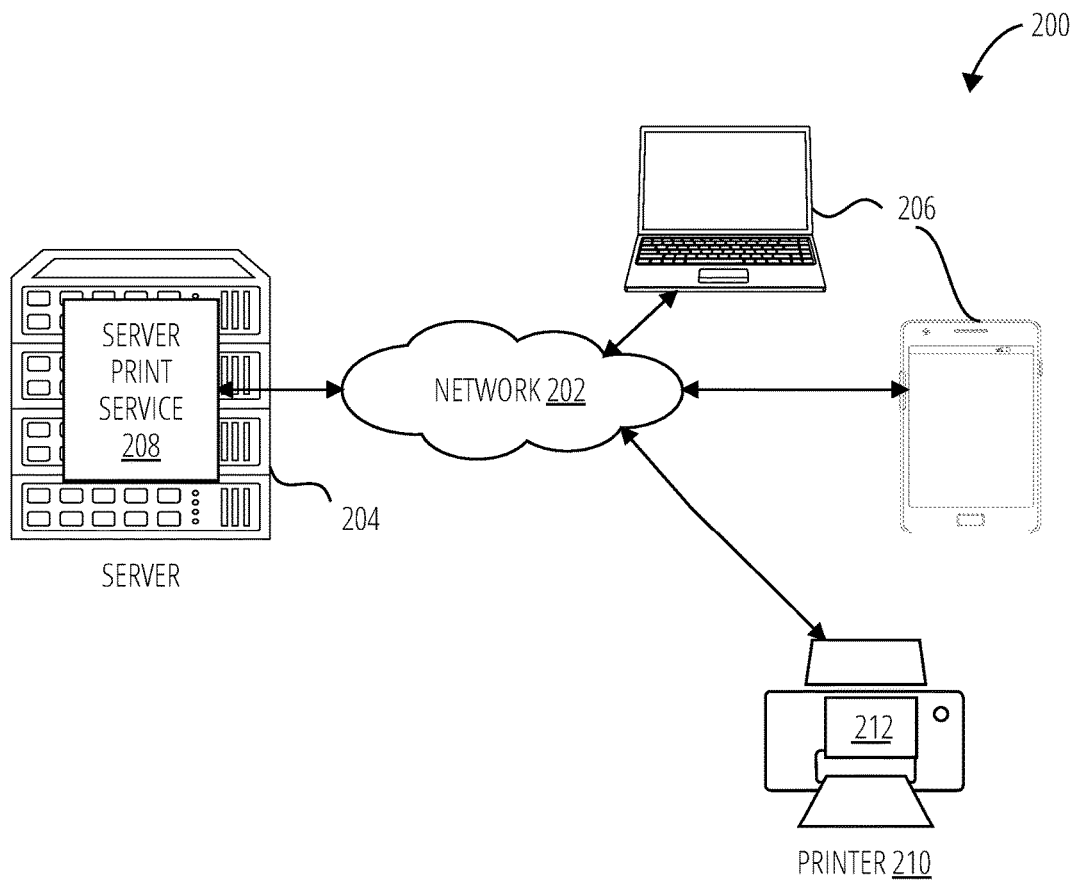
FIG. 2 illustrates a printer system 200 in accordance with one embodiment.

FIG. 2 illustrates a printer system 200 in accordance with one embodiment. The printer system 200 is a centralized management system for re-usable printer control settings for one or more printer 210. The server print service 208 is hosted by one or more server 204 and is accessible and available via a network 202 wherever document creation, editing and printing can be done, e.g. from desktop, laptop, tablets, smartphones, and other client devices 206. The server print service 208 operates with various operating systems of the client devices 206, such as Windows, Linux, Unix, MacOS®, iOS®, Android®, among others, through a software service or other interface that enables communication of user selected printer control settings between the server print service 208 and the applications and device drivers of the client devices 206.

The server print service 208 selects and configures the printer 210 and/or client devices 206 with printer control settings based on document categories (document-specific, document-type), location categories (office name, office location, company name, etc.), and account categories (user login, team, department, and others).

In various embodiments, the network 202 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. In some embodiments, the network 202 may also include a voice network that conveys not only voice communications, but also non-voice data such as Short Message Service ("SMS") messages, as well as data communicated via various cellular data communication protocols, and the like.

In various embodiments, the client devices 206 may include desktop PCs, mobile phones, laptops, tablets, wearable computers, or other computing devices that are capable of connecting to the network 202 and communicating with the server 204.

In various embodiments, additional infrastructure (e.g., cell sites, routers, gateways, firewalls, and the like), as well as additional devices may be present. Further, in some embodiments, the functions described as being provided by some or all of the server 204 and the client devices 206 may be implemented via various combinations of physical and/or logical devices.

Logic is configured on the client devices 206 that the user utilizes for document printing. The client devices 206 utilize the printing preferences for the user, document, etc., by accessing and interacting with the server print service 208.

Users that belong to same project team or office department inherit common printing preferences that override control panel default printing preferences of a client device. This enables office administrators and managers to assign pre-set printing preferences that define the character of the team or department, and for more efficient utilization of resources such as color toner, monochrome toner, finishing options, paper, or media types.

The server print service 208 in one embodiment supports the following categories of printing preferences:

Preferences specific to individual documents
Preferences specific to document types
Preferences specific to location of document
Preferences specific to individual users
Preferences specific to teams
Preferences specific to departments
Preferences specific to office location
Preferences specific to other categories.

The server print service 208 manages printing preferences in a hierarchy, based on user membership settings. For example, each user in a configured department of an organization will inherit printing preferences set for the department. Printing preferences transfer with and are associated with the user or groups of users to different machine environments where the user(s) work, for example different devices and/or physical locations where user(s) create, edit and print documents.

As users create, edit and print documents, they select and assign default printing preferences for the documents. There may be requirements to keep those printing preferences from becoming the default printing preferences for the documents indefinitely, for example by limiting them to a period of time. The document-specific printing preferences will not override the print queue default printing preferences in the control panel, which may be needed by other users.

As the user utilizes different computing devices, across the network or the cloud (such as OneDrive®, Google Drive®, Dropbox®, among others), the printing preferences that a user associates with specific documents will remain associated with the documents, and be available for use on any client device that the user utilizes for processing the documents, wherever the documents are printed from.

Some document types may be better printed using a document-type specific set of printing preferences. For example, spreadsheets may be printed by default in draft or low quality modes. Presentation slides may by default be printed on thick paper media, in landscape orientation, with "Normal" quality. Pictures may be printed by default using glossy photo paper and in landscape orientation mode.

Shared folders or network storage where documents are saved can be assigned default printing preferences that apply to all types of documents saved in that location. This category can include cloud document storage services such as Dropbox, OneDrive, and iCloud®, among others.

Any document or file saved in the shared location can also have common or pre-defined set of printing preferences particular to a project, department, or activity. Collaboration among varied people and teams will be assisted to have a common look and quality of printed documents.

Different people may have varying printing preferences for their documents. Pre-defined teams created by managers or administrators can have a shared set of printing preferences that will take effect as higher priority than control panel defaults. Wherever the members of the team access a document and attempt to print, the assigned printing preferences for the team will take effect and be reflected on their print jobs.

Users may also create teams or groups for collaboration purposes. The user can define printing preferences for a group, and invite members to the group. Wherever users attempt to print documents that are shared in the group, the printing preferences for the group will take priority over lower priority printing preferences, for example the control panel default printing preferences.

Groups of people, teams, departments, office locations, companies, and other categories of users may configure team, departmental, office-wide, and company-wide printing preferences. Teams and departments may be assigned to use pre-defined printing preferences such as black & white only printing, plain paper-only printing, and duplex only printing, for example. This will help optimize printing workflows for the group or category, and help to differentiate or assign unique printing personality to the group or category, as compared to others.

The printer 210 generates the actual media print out. Print jobs may include a job parameter (described later) that instructs the printer 210 to apply specified or default printer control settings (as determined by applied printing preferences for the job) to the incoming print job. These printer control settings override printer control settings that are included in the print job from other sources.

Figure 3:
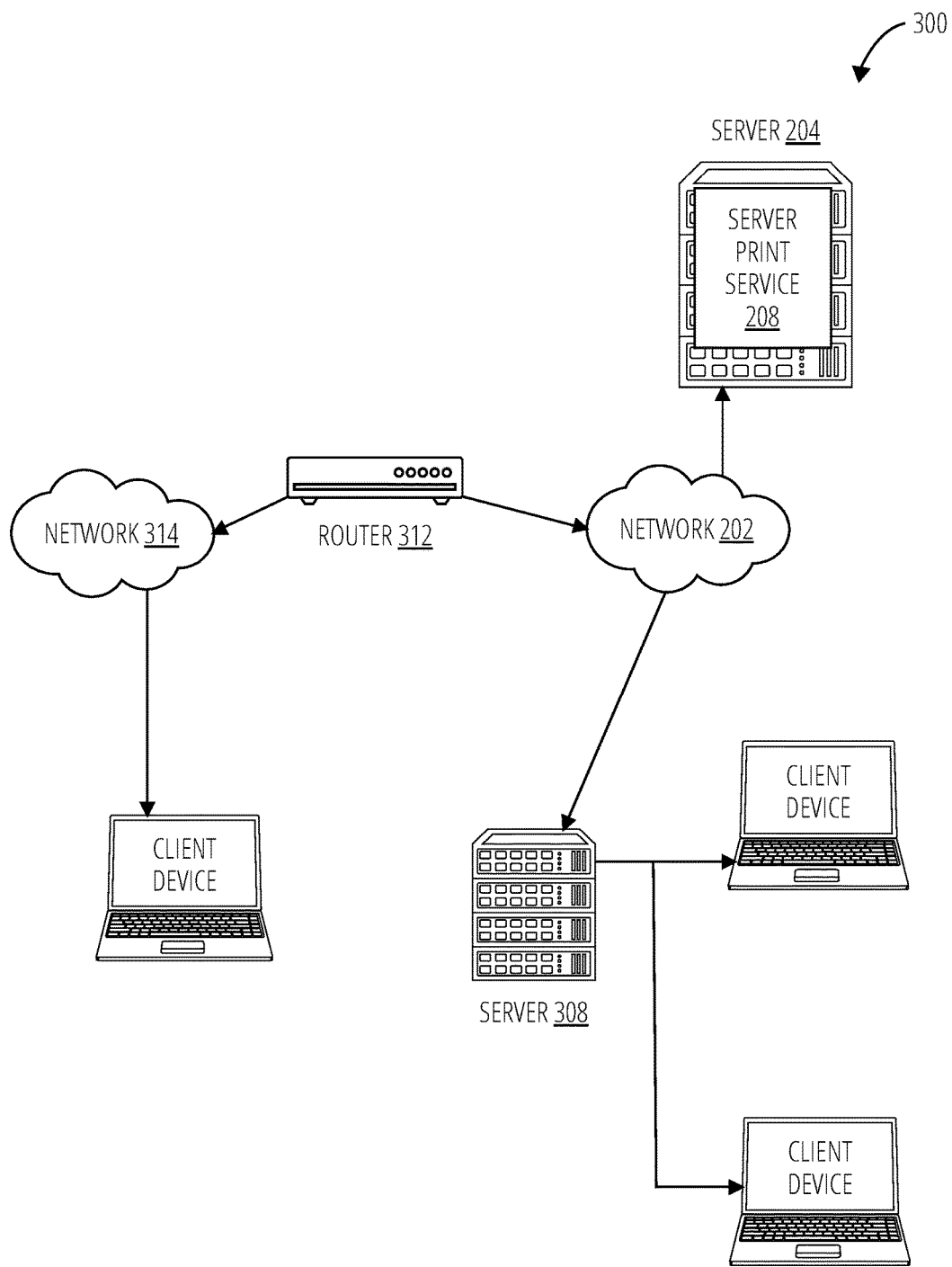
FIG. 3 illustrates an embodiment of a network configuration 300.

Referring to FIG. 3, the server print service 208 may be utilized by client devices in an extended network configuration 300. For example, the network 202 for the server 204 hosting the server print service 208 may bridge to another network 314 using a switch, bridge, or router 312 device, extending the server print service 208 to client devices on the other network 314. The server print service 208 may also extend to client devices coupled to the network 202 via another server 308. These are just some examples of configurations in which client devices 206 may access the server print service 208.

Figure 4:
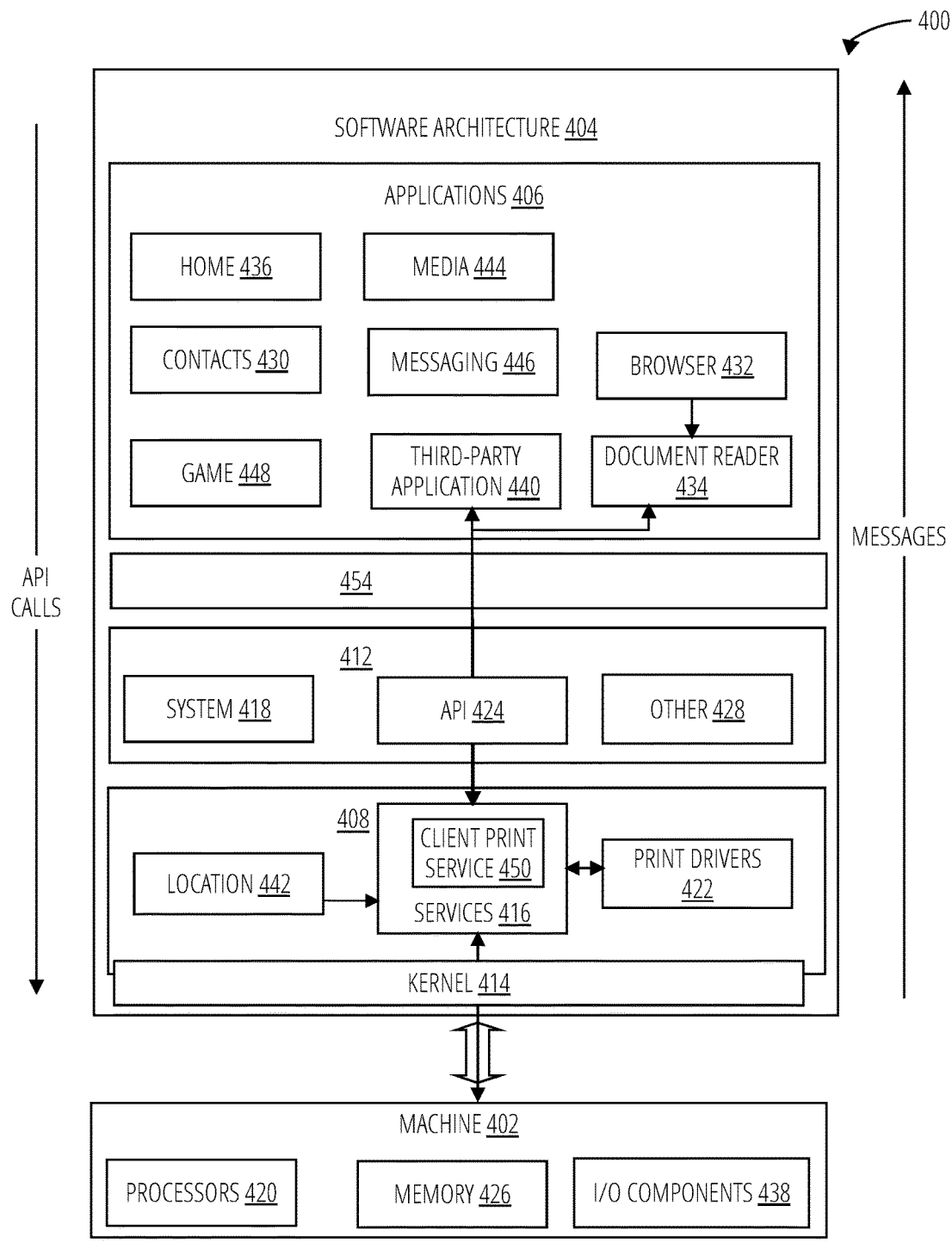
FIG. 4 illustrates client logic 400 in accordance with one embodiment.

FIG. 4 is block diagram illustrating an architecture of client logic 400, which may be installed on any one or more of the client devices 206, for example. FIG. 4 is merely a non-limiting example of a software architecture 404, and it will be appreciated that many other architectures can be implemented to facilitate the functionality described herein. In various embodiments, the software architecture 404 is implemented by hardware such as a machine 402 that includes processors 420, memory 426, and I/O components 438. In this example software architecture 404, the client logic 400 may be conceptualized as a stack of layers where each layer may provide a particular functionality. For example, the software architecture 404 includes layers such as a kernel 414, libraries 412 frameworks 454, and applications 406.

Operationally, the applications 406 invoke application programming interface calls via the API libraries 424 through the logic stack and receive messages in response to the API calls.

In various implementations, the operating system 408 manages hardware resources and provides common services. The operating system 408 includes, for example, a kernel 414, document location logic 442, services 416, and print drivers 422. The kernel 414 acts as an operational layer between the hardware and the other software layers. For example, the kernel 414 provides memory management, processor management (e.g., scheduling), component management, networking, and security settings, among other functionality. The services 416 can provide other common services for the other software layers, such as client device logic to interact with the server print service 208. The print drivers 422 are responsible for controlling or interfacing with one or more printer 210 and, in the printer system 200, may interface with one of the services 416 (e.g., client printing service 450) to enable the flexible and hierarchical printing preferences as described herein. In various embodiments, the print drivers 422 may be logic of the client devices 206, a print server (e.g., server 204), or any device coupled to the printer 210 directly or via the network 202. The document location logic 442 may identify and provide location information for documents (e.g., which server/folder they are stored in) to the client printing service 450, which in turn provide location features to higher layers. The document location logic 442 may also be accessible directly to higher layers via the operating system 408 in some embodiments.

Other device drivers of the operating system 408, in addition to the print drivers 422, include display drivers, camera drivers, BLUETOOTH® or BLUETOOTH Low Energy (BLE) drivers, flash memory drivers, serial communication drivers (e.g., Universal Serial Bus (USB) drivers), WIFI® drivers, audio drivers, power management drivers, and so forth.

In some embodiments, the libraries 412 provide common infrastructure utilized by some of the applications 406. The libraries 412 can include system libraries 418 (e.g., C standard library) that can provide functions such as memory allocation functions, string manipulation functions, mathematic functions, and the like. In addition, the libraries 412 can include API libraries 424 such as media libraries (e.g., libraries to support presentation and manipulation of various media formats such as Moving Picture Experts Group-4 (MPEG4), Advanced Video Coding (H.264 or AVC), etc.), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and libraries to support access to and interaction with the server print service 208. The libraries 412 can also include a wide variety of other libraries 428 to provide many other APIs to the applications 406.

The frameworks 454 provide a high-level common infrastructure that can be utilized by the applications 406, according to some embodiments. For example, the frameworks 454 provide various graphic user interface (GUI) functions, high-level resource management, high-level location services, and so forth. The frameworks 454 can provide a broad spectrum of other APIs that can be utilized by the applications 406, some of which may be specific to a particular operating system or platform. In some embodiments the frameworks 454 include functions to enable one or more third-party application 440 to access and interact with the server print service 208 via the client printing service 450.

In an example embodiment, the applications 406 include a home application 436, a contacts application 430, a browser application 432, a document reader application 434, a media application 444, a messaging application 446, a game application 448, and a broad assortment of other applications such as a third-party application 440. According to some embodiments, the applications 406 are programs that execute functions defined in the programs. Various programming languages can be employed to create one or more of the applications 406, structured in a variety of manners, such as object-oriented programming languages (e.g., Objective-C, Java, or C++) or procedural programming languages (e.g., C or assembly language). In a specific example, the third-party application 440 (e.g., an application developed using the Android or iOS software development kit (SDK) by an entity other than the vendor of the particular platform) may be mobile software running on a mobile operating system such as iOS, Android, Windows Phone®, or another mobile operating system. Any of these applications may utilize the adaptive printing preference capabilities disclosed herein.

In the client logic 400 embodiment, the third-party application 440 accesses the features of the client printing service 450 via API libraries 424, which, in networked embodiments, communicate via the kernel 414 with the machine 402 to operate IO components to the network 202 to access and interact with the server print service 208. In some embodiments, the client printing service 450 may interact with the print drivers 422 to cooperate with the kernel 414 to operate a locally attached printer.

In similar fashion, the browser application 432 in this example utilizes a document reader application 434 (e.g., PDF or Microsoft Word® document reader logic) to interact with documents, and the document reader application 434 accesses and interacts with the client printing service 450 in the same manner as the third-party application 440.

In various embodiments, the client printing service 450 may interact with a server print service 208 that is hosted by an enterprise network server, or which is a cloud service (e.g., cloud hosted printer system 600) that receives from and sends data to the other supporting components in the client devices 206 or print engine logic 212.

The printing service may be enabled on the client by integration of the print drivers 422 with the client printing service 450, to enable one or more of the print drivers 422 to prompt the user for printing preference types to associate with one of the printing preference categories (e.g., see printing preference user interface 700). The integrated service enables storage and possibly sharing of the printing preferences, either locally, or on a networked storage device (e.g., printing preferences database 608 in a cloud system). In some implementations, the client printing service 450 is implemented by and as a part of the print drivers 422.

A third-party application 440 that presents printing preferences through direct interface or through plug-ins (e.g., document reader application 434) may manage, retrieve, record, and distribute printing preferences, to apply them in the document creation, editing and printing workflow.

Applications receive the set of printing preferences assigned to the user or that the user has selected in a previous session, either in a desktop, laptop, or in another mobile device.

In some embodiments, the server print service 208 may be integrated in the print engine logic 212 of the printer 210 to dynamically determine printing preferences (and thus the actual printer control settings to apply) for a particular print job. The printer 210 may apply printing preferences assigned to the user, or to the document or document type (or other categorization) that the user is printing, and the print engine logic 212 may resolve these printing preferences to printer control settings specific to a user, document, organization, document location, document type, etc. internally (e.g., the printer 210 stores the printing preferences), or else the print engine logic 212 may interact with the server print service 208 to retrieve and apply the printing preferences for the print job.

Print job submissions may include a parameter, for example a printer job language (PJL) parameter such as:

@PJL SET SPP=ON

This setting indicates that the printer control settings included in the print job are the final set of printer control settings to be applied for the print job at the print engine logic 212. The print engine logic 212 would typically suppress further adjustments to the printer control settings in this case.

The client printing service 450 may execute as a background service via which applications can retrieve and submit printing preferences. Direct support in applications or plug-in support enables applications to set printing preferences for the user, document, document-type, team, etc.

Users can manage and save the printing preferences that applications receive, display, and apply to a variety of print jobs. The printing preferences may be presented, changed, and saved from within the application when the user launches and interacts with a printing preferences user interface 700, which in some embodiments is provided via the print drivers 422. The user may also launch and interact with the printing preferences user interface 700 from the Control Panel of the operating system 408.

Administrators or managers may set certain printing preferences as immutable (by the user) for the user, document, document-type, document location or other categorization.

When the printing preference user interface 700 is closed by selecting to save the printing preferences, the printing preferences, preference types, and user associations are saved. If no printing preference types are specified, any previously specified printing preference types are retained unchanged. Herein, 'preference types' refers to the different categories to which the printing preferences are applied (users, documents, document types, teams etc.)

Figure 5:
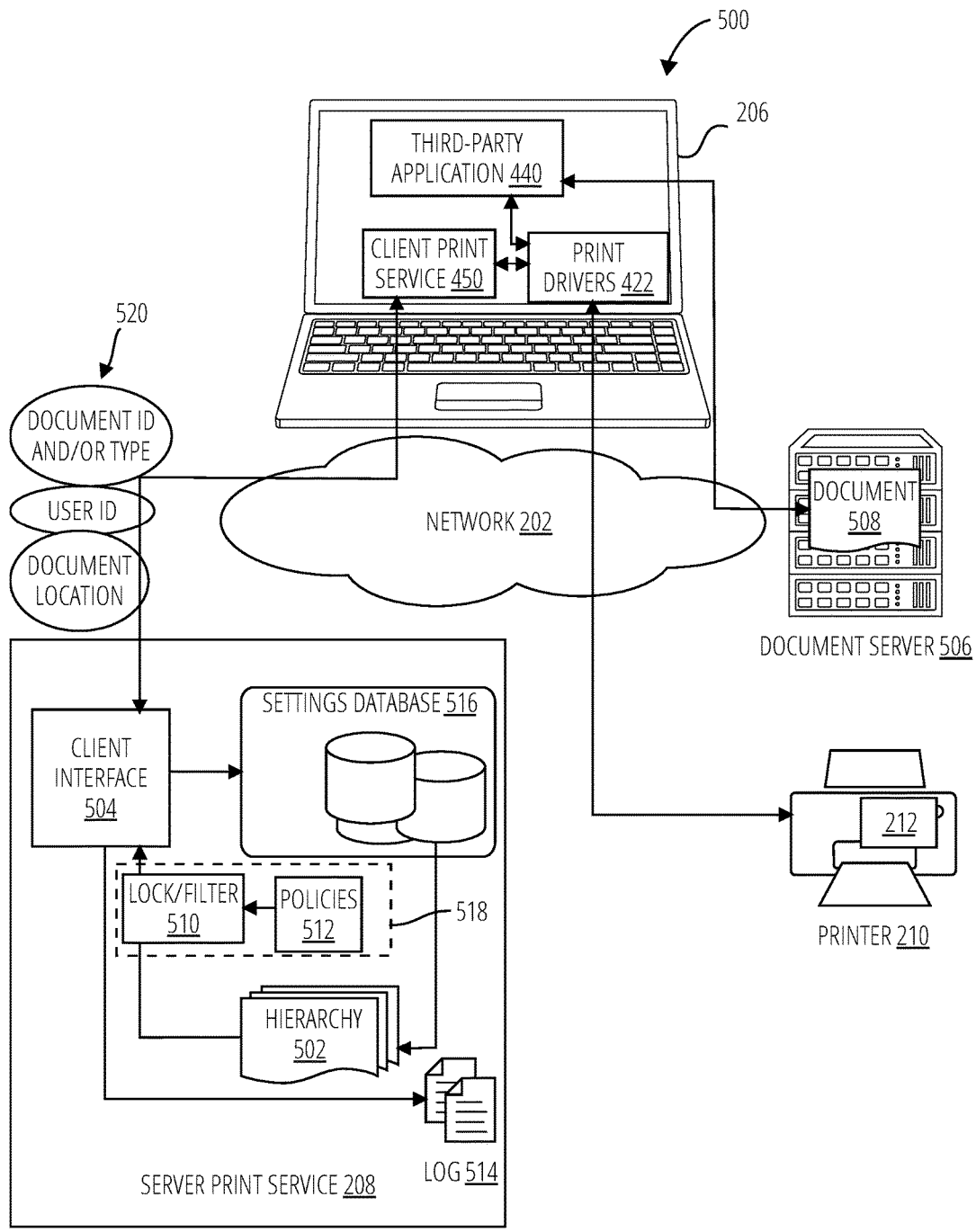
FIG. 5 illustrates a printer system 500 in accordance with one embodiment.

FIG. 5 illustrates a printer system 500 in accordance with one embodiment. Client devices 206 utilize the printer system 500 over a network 202, to access a server print service 208 when printing a document 508 on a printer 210.

In one embodiment, when the user selects to print the document 508 from the third-party application 440, the third-party application 440 engages the client printing service 450 which provides one or more of a document ID, document type, document location (where the document is hosted on storage), and a user ID to the server print service 208. The document location may be provided by document location logic 442 using techniques known in the art for locating the storage location of files in networked environments.

The client printing service 450 may in some embodiments interact with the server print service 208 via the client interface 504, to look up printing preferences for the user, the user's organization, team, the document 508, and/or document location. These printing preferences are stored in a printer control settings hierarchy 502, which determines the precedence of the various printer control settings corresponding to the various printing preference types. The settings are applied to lock/filter 510 logic to lock down (prevent user changes to) or remove (filter out) printing preferences, and hence printer control settings, that the user does not have privilege to override and/or set, as determined by pre-configured and stored policies 512. The print request may be stored in a log 514 for reporting or tracking purposes.

In one embodiment, the printing preferences (as extracted, filtered, and locked) are communicated to the print drivers 422 via the client printing service 450. (As noted prior, the client printing service 450 may be implemented as part of the print drivers 422 in some implementations). The third-party application 440 displays the printing preferences from the print drivers 422 to the user of the third-party application 440, and the user makes any allowed and desired changes using the printing preference user interface 700.

Figure 6:
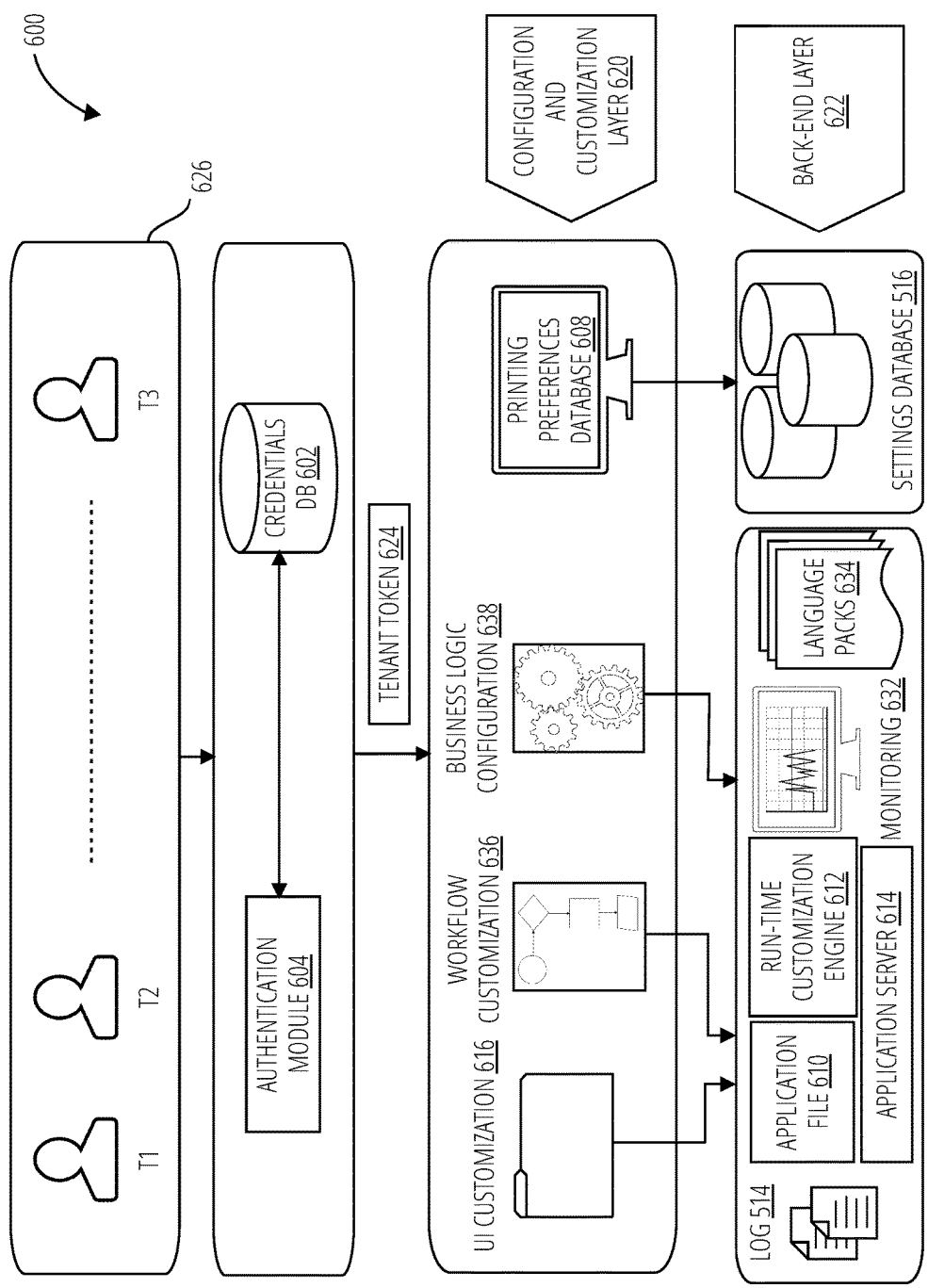
FIG. 6 illustrates a cloud hosted printer system 600 in accordance with one embodiment.

FIG. 6 illustrates a cloud hosted printer system 600 in accordance with one embodiment. Tenants 626 (users) provide authorization credentials to the authentication module 604, which compares the provided credentials to stored values in the credential database 602, and grants access when there's a match. Once a tenant authenticates, a tenant token 624 is generated and used to access the tenant's printing preferences in the printing preferences database 608. The tenants' printing (and possible other) preferences are added to the settings database 516 and a printing session is instantiated. As noted, these printing preferences can be for a document, document type, specific tenant, workgroup, etc. In some cloud system architectures, a configuration and customization layer 620 establishes the tenant printing preferences for the session, by causing display of the printing preferences user interface 700 on the user's computing device. The configuration and customization layer 620 may also provide UI customization 616, workflow customization 636, and business logic configuration 638.

The tenant's printing session may be implemented as an application instance of an application server 614 in a back-end layer 622. The printing session may utilize an application file 610 for temporary data or other data to support the session. A run-time customization engine 612 may provide features unique to the tenant, their workgroup, the document, document type, etc., such as printing features unique to the tenant's workflow, language preference (e.g., language packs 634) user interface, or business logic. The back-end layer 622 may further include monitoring 632 of the printing session, and a log 514 of the session.

The cloud hosted printer system 600 will typically include the functionality of the server print service 208 as illustrated in FIG. 5 (preference printer control settings hierarchy 502, lock/filter 510, etc.), and will operate similarly, the key difference being the server print service 208 being implemented in a cloud environment vs on a corporate server.

Applications on mobile and non-mobile devices may interact with the cloud hosted printer system 600 as follows. When a user (e.g., tenant) opens a Print Dialog or Printing Preferences user interface in an application, the application engages the authentication module 604 with the credentials of the user. As described above, the cloud hosted printer system 600 authenticates the user and creates a printing session with their printing preferences, and possibly additional customizations for workflow, user interface, business logic, languages, etc. The cloud hosted printer system 600 returns the printing preferences assigned to the user's account, team, department, or to document or document type that user has opened, or for whichever categorizations apply.

The user selects and saves printing preferences in the Printing Preferences dialog, and those printing preferences determine the printer control settings applied to the printer, when printing the document. This set of printing preferences is assigned priority over default printing preferences by the back-end layer 622.

The cloud hosted printer system 600 tracks and monitors the use of the printing preferences. In applications with direct or plug-in support for the cloud hosted printer system 600, the printer control settings corresponding to the printing preferences are either passed from the application to the back-end layer 622 for communication to the printer (if it's a printer networked from the cloud hosted printer system 600), or from the back-end layer 622 to the application if the printer is networked from or directly connected to the user's device.

Figure 7:
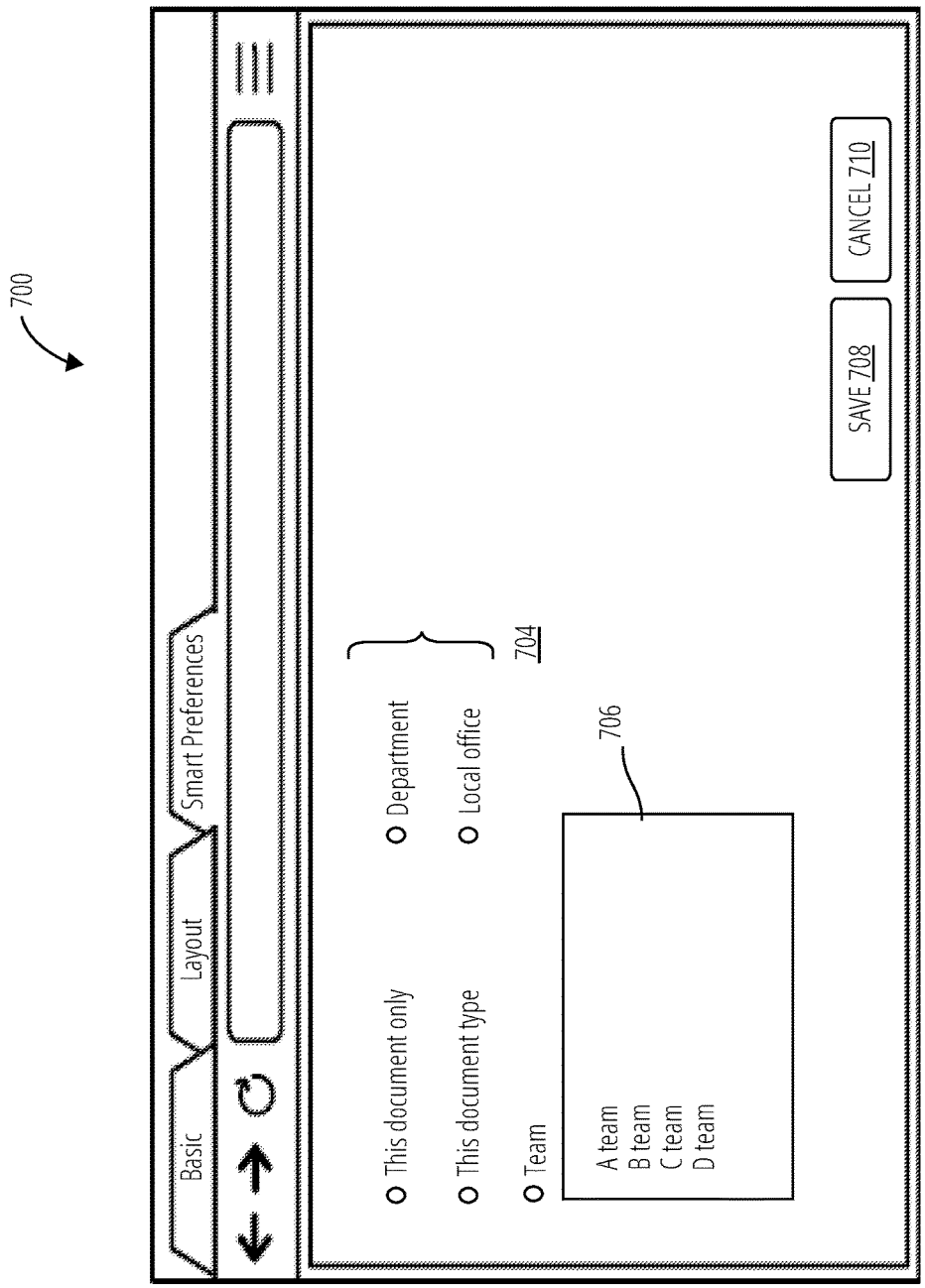
FIG. 7 illustrates a printing preference user interface 700 in accordance with one embodiment.

FIG. 7 illustrates a printing preference user interface 700 in accordance with one embodiment. The printing preference user interface 700 enables the user to set printing preferences (e.g., Basic, Layout) for a current print job, and to save the printing preferences to apply to particular printing preference types in the future (the 'Smart Preferences' tab in FIG. 7).

The set of printing preference types 704 that are presented for selection by the user depend upon what rights the user has been configured with on the printing service 208. At the minimum, users are assigned permission to configure printing preferences for their personal documents or document-types they work with. With additional permissions, a user may also create a user-group or personal team, invite members or friends, and apply printing preferences to that group or team.

In some embodiments, a user may also create a shared storage or file folder location so that collaborators can share a common set of printing preferences for that document location.

Administrators, managers, or users may enable and designate the print printing preferences to apply to particular types of print jobs. The printing preference user interface 700 enables selection from a team selection control 706 for one or more teams to which to apply the printing preferences. The printing preference user interface 700 may enable a user or administrator to create and add new teams to the team selection control 706, if needed.

The printing preference user interface 700 is a unified and compact interface for applying printing preferences at a variety of levels of organization and detail (a hierarchy). The settings in the Basic and Layout tabs are applied to the one or more preference types 704 and/or team selection control 706 selections applied from the "Smart Preferences" tab (so named in this example) and determine their place in the printer control settings hierarchy 502.

The printing preference user interface 700 will typically be provided to applications by the particular one of the print drivers 422 associated with the printer selected by the user for printing. The printing preference user interface 700 includes a plurality of types of graphical user interface control settings received in a network response communication from the server print service 208. The server print service 208 correlates one or more of a user identity, document type, and/or document location provided in an inbound communication 520 from a print driver or client printing service 450 with a hierarchy of persistent printer control settings for the user (e.g., printer control settings hierarchy 502), and extracts the hierarchy of persistent printer control settings for the user identity (and/or for the document, document type, document location, user organization or team, etc.) from its associative machine storage (e.g., settings database 516).

The lock/filter 510 logic is coupled to the associative machine storage and adapts the printer control settings hierarchy 502 according to stored policies (e.g., policies 512). The printer control settings hierarchy 502 is adapted by disabling (locking or filtering) changes to particular printer control settings of the printer control settings hierarchy 502 for the user. Disabling changes to settings can include locking the settings by disabling the ability to change them (e.g., 'graying out' the settings) in a response communication to the client, or removing them altogether from the response communication (filtering the settings out of inclusion in the response communication).

The control logic 518 for the printer 210, which for example includes the lock/filter 510 logic in the illustrated example, organizes a network response to the inbound communication 520 from the client. The response communication includes different types of graphical user interface control settings. These control setting types include a first type of the graphical user interface control settings (e.g., basic and layout settings) that are settings to control the operation of the printer associated with the hierarchy of persistent printer control settings. A second type of the graphical user interface control settings serve a dual purpose. First, if the user sets these settings and saves them, they are applied back to the server print service 208 to change and otherwise control a position of the printer control settings (the first type) in the hierarchy of persistent printer control settings, for future print jobs. Second, they provide a mechanism by which the logic forming the printing preference user interface 700 can simplify the presentation of the control settings into different control zones, e.g., tabs, those that control the printer, and those that categorize the printer control settings into a hierarchy of preference categories.

Figure 8:
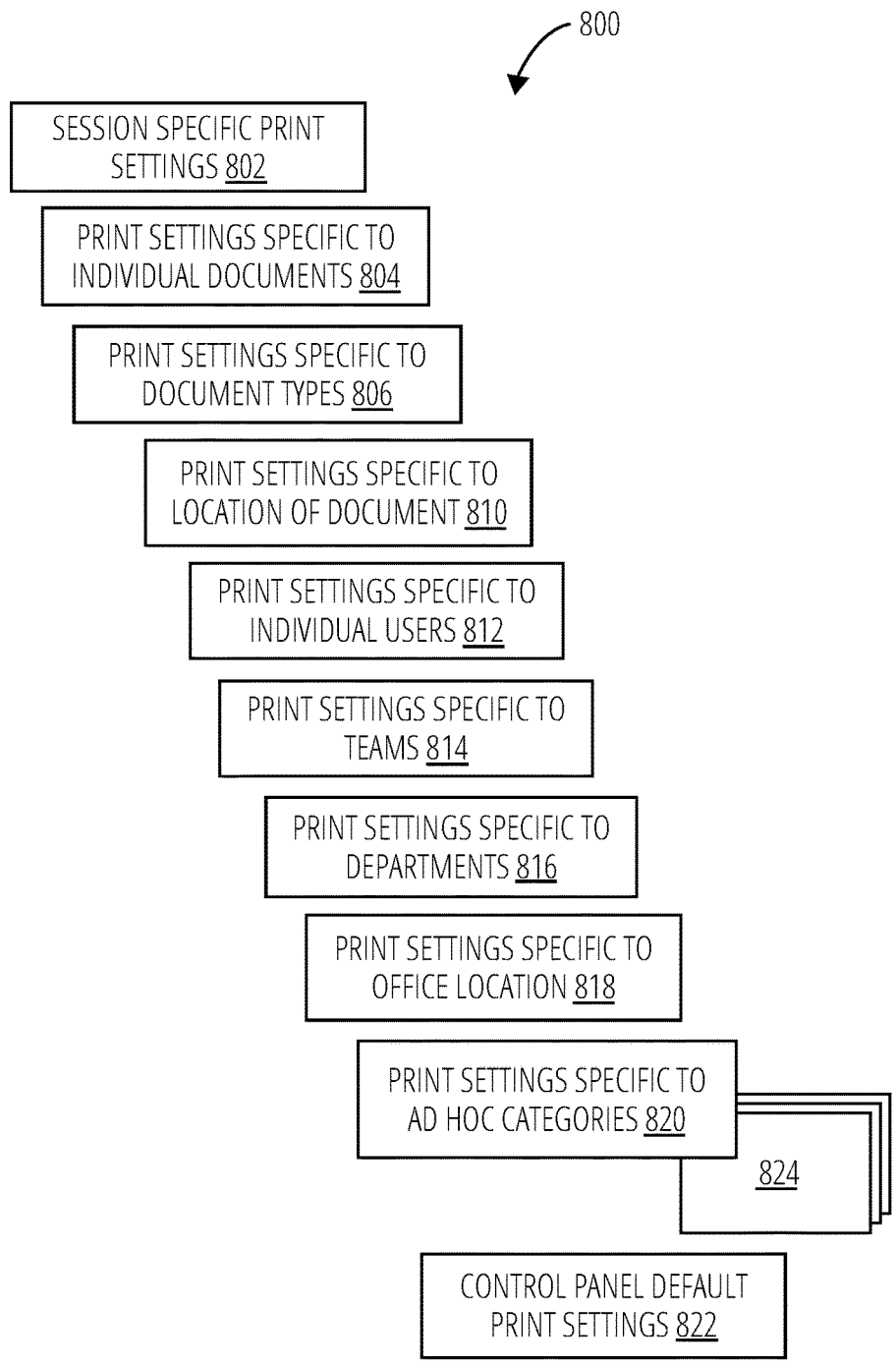
FIG. 8 illustrates a printer control settings prioritization 800 in accordance with one embodiment.

FIG. 8 illustrates a printer control settings prioritization 800 for a hierarchy of persistent printer control settings, in accordance with one embodiment. The printer control settings prioritization 800 is as follows:

session specific printer control settings 802;
    printer control settings specific to individual documents 804;
        printer control settings specific to document types 806;
        printer control settings specific to location of document 810;
        printer control settings specific to individual users 812;
    printer control settings specific to teams 814;
    printer control settings specific to departments 816;
    printer control settings specific to office location 818;
    printer control settings specific to ad hoc categories 820; and
    control panel default printer control settings 822.

The printer control settings prioritization 800 assigns priority to each preference type level. The session specific printer control settings 802 are settings that user changes through the printing preference user interface 700 for a specific print session. These settings are only used for the specific session of printing the document, and in one embodiment are not saved for subsequent sessions.

The printer control settings specific to ad hoc categories 820 may be divided into a hierarchy of ad hoc subcategories 824. In other words, a particular ad hoc category may itself comprise a hierarchy of ad hoc subcategories (See illustration in FIG. 8).

In the absence of session specific printer control settings 802 and other types of preferences, the control panel default printer control settings 822 are the applied printer control settings.

If user changes any of the settings at any level of the printer control settings prioritization 800 (settings that are not configured as unchangeable by an administrator), they become effective only for the current print session (while the document to print is open). The printing preference user interface 700 will typically include a save 708 control to save the changes (e.g., to the settings database 516) for use in subsequent sessions, and a cancel 710 control to reset (discard) any changes.

Operating the save 708 control generates a second inbound communication to the server print service 208. The second inbound communication includes control settings of the first type and of the second type. The server print service responds to receiving the second inbound communication by storing the control settings of the first type from the second inbound communication in the hierarchy of persistent printer control settings, as determined by the control settings of the second type from the second inbound communication. In other words, the second inbound communication has a similar content to the outbound communication generated by the server print service 208 in response to the first inbound communication 520 from the client devices 206, except that it includes modifications made to the printing preferences and printer control settings from the outbound communication, using the printing preferences user interface 700 for the current print job.

Once the user saves and applies printing preferences for a document, they are converted to printer control settings, and they become the default printer control settings for future print jobs for the document. The printer control settings may be saved with the document (e.g., as metadata), or stored by the server print service 208 in association with a unique identification of the document.

The printing preference user interface 700 enables the current printer control settings to be applied in the future automatically as printing preferences for documents of the same types as the current document type being printed (e.g., Word, PDF, Powerpoint®, browser window, etc.).

Figure 9:
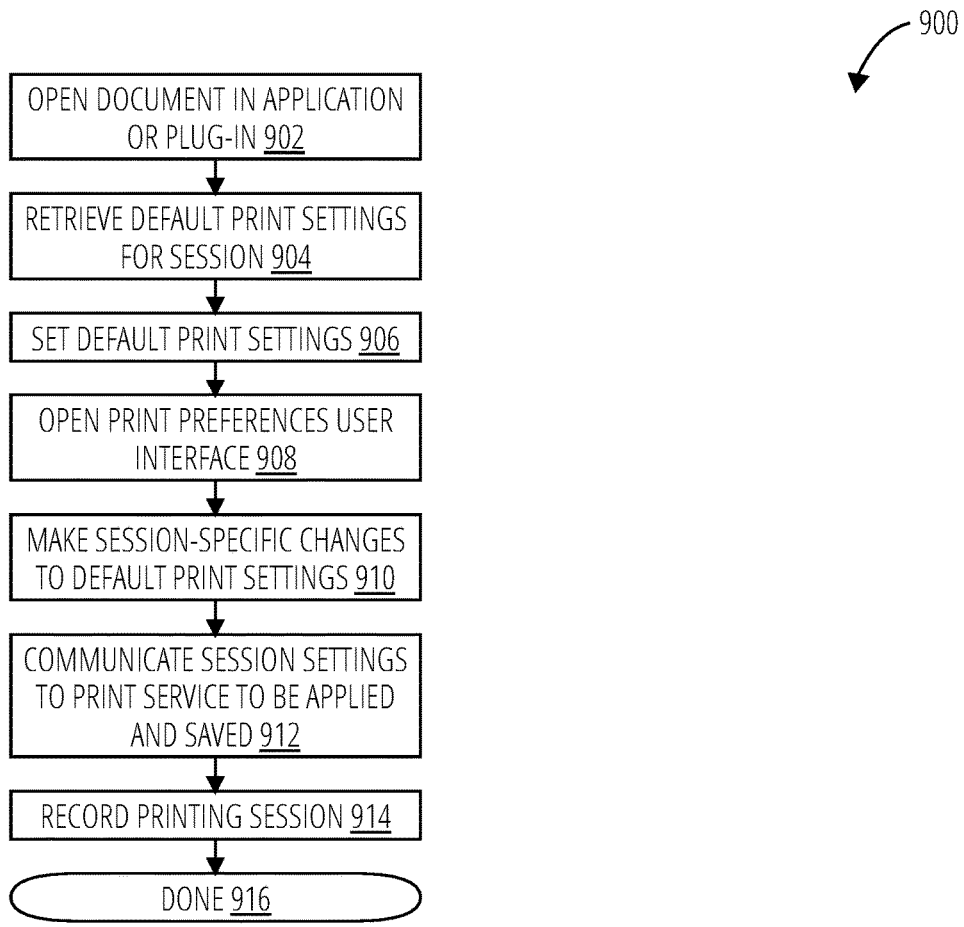
FIG. 9 illustrates a printer settings process 900 in accordance with one embodiment.

FIG. 9 illustrates a printer settings process 900 in accordance with one embodiment. In block 902, open a document in an application or plug-in. In block 904, the process 900 retrieves default printer control settings (stored as printing preferences) for the printing session. In block 906, the process 900 sets default printer control settings for the printing session. In block 908, the process 900 opens a printing preferences user interface. In block 910, the process 900 makes session-specific changes to the default printer control settings, as determined by selected printing preferences. In block 912, the process 900 communicates session printing preferences to the print service to be applied and saved as printer control settings. In block 914, the printing session is recorded.

For example, when the user launches or selects to print from a document-reading application or an application using a document reader plug-in, the print service retrieves, selects and sets the default printing preferences, if any, to apply to the user's session. The printing preferences may be any one or more of the types described previously.

The user may change the printing preferences and hence the printer control settings during the editing or viewing of a document, in which case such printing preferences are relayed to the server print service 208 for recording and saving the corresponding printer control settings in the appropriate level of the printer control settings hierarchy. The user may designate the printing preferences to apply to different preference types. The printing preferences (representing, or directly as, printer control settings) and associated priority levels in the print setting hierarchy 502 are recorded and saved by the print service 208.

The print service 208 may also record aspects of the print session when saving the printing preferences that the user has selected or made, in order to provide the printing preferences from other computing devices at a later time.

In one embodiment, when a computing system queries for the default printer control settings to apply for a particular user, the computing system queries the selected printer print drivers 422 or in some cases, the print queue, and receives a set of default printer control settings that accord with the stored printing preferences for the user. This ensures that the printer control settings are compatible and will work according to the expectations of the user on printouts for the selected printer.

As the user picks or selects other printers to print to, the computing system (e.g., one of the client devices 206) will re-perform this process in order to load applicable printer control settings that work for the newly selected target printing device, and which accord with the user's stored printing preferences, and which conform to the different capabilities of the newly selected printer.

Selected printers and printer drivers may have varying capabilities. Thus, the saved printing preferences, while uniform and pre-defined for each user, document, document-type, and other categorizations or groupings, may also be made specific or related to the selected target printing devices in the settings database 516.

In an office environment, administrators (e.g., IT personnel) will typically be involved in the configuration of printing preferences for employees. This typically involved privileged categories of users, such as administrators, with authority to assign preferences in an office environment. The printing preferences for office workers may be defined, specified, and set only by specially authorized or privileged users.

Varying permissions or rights or groups of those rights can be assigned to users to limit the scope of assignable printing preferences:

Guest Privileges

This privilege enables the most basic capability, which does not enable the user to set printing preferences. Guests will only be able to utilize the Control Panel default printing preferences, or whatever printing preferences are pre-defined for the guest account or a particular print queue or printer driver.

User Privileges

This privilege level enables users to define printing preferences that follow the user from wherever or whichever device or location the user is printing from.

Possible printing preferences that can be created with this privilege level are printing preferences specific to individual documents, specific to document-type, and specific to the user's own account.

User privileges may also enable the creation of groups or teams, with which the user can share personal printing preferences.

Team Privileges

This privilege level enables users to set printing privileges or restrictions for teams. Administrators, project leads and managers with this privilege level may create permanent or official teams, and assign associated team printing preferences.

Departmental Privileges

This privilege level enables users to set printing privileges or restrictions for an entire department. Administrators and managers with this privilege level may select departments and assign departmental printing preferences.

Special category privileges—office locations, companies, associations, among others.

These privilege levels enable users to set printing privileges for various ad-hoc categories.

Administrators may restrict a user's capabilities to change particular types of printing preferences. The administrator may configure the control logic 518, via the policies 512, to disable changes to particular types of printing preferences by the user. Those unchangeable printer control settings will show up as "disabled" or grayed out (locked) in the printing preference user interface 700, or will be absent altogether (filtered). This enables for example an office or company to have a fixed set of printing preferences that users must adhere to.

Printer control settings may be prioritized in the printer control settings hierarchy 502 according to printing preference types. For example, printing preferences defined by office administrators or managers for teams, departments, office locations and other categorizations may have higher priority than printing preferences set by less privileged users. For example, users may not be allowed to override team level or department level printing preferences that maximize use of company printing resources (e.g., use of monochrome toners for the team or department, and printing certain types of documents in draft quality, to conserve toner).

In various embodiments, the print preference types 704 may be stored by the printer 210, by the server 204 or a network storage device or system accessible to the server print service 208 and/or by the client printing service 450 or print engine logic 212, or are stored by the printing preferences database 608 of a cloud hosted printer system 600.

Figure 10:
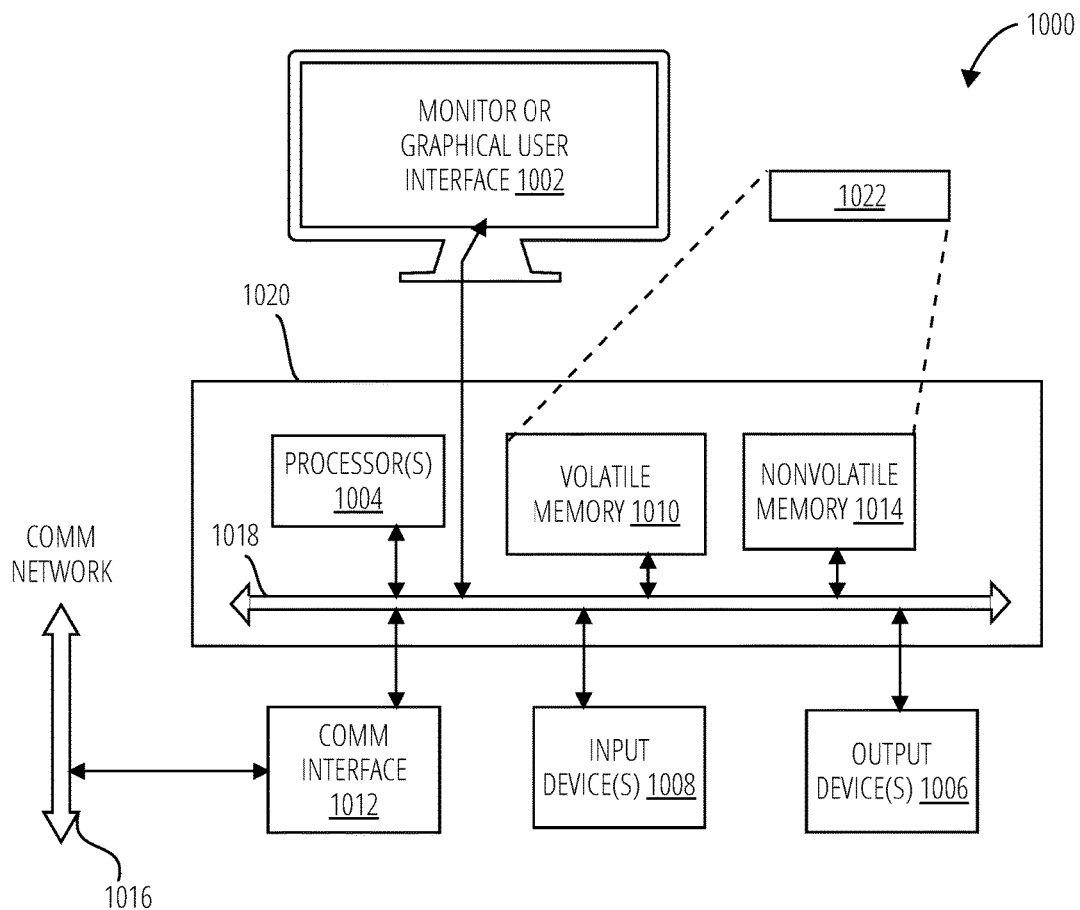
FIG. 10 is an example block diagram of a computing device 1000 that may incorporate embodiments of the present invention.

FIG. 10 is an example block diagram of a computing device 1000 that may incorporate embodiments of the present invention. For example, the server 204, one or more of the client devices 206 including the client logic 400, and/or the printer 210 may be implemented using embodiments of the computing device 1000.

FIG. 10 is merely illustrative of a machine system to carry out aspects of the technical processes described herein, and does not limit the scope of the claims. One of ordinary skill in the art would recognize other variations, modifications, and alternatives. In one embodiment, the computing device 1000 typically includes a monitor or graphical user interface 1002, a data processing system 1020, a communication network interface 1012, input device(s) 1008, output device(s) 1006, and the like.

As depicted in FIG. 10, the data processing system 1020 may include one or more processor(s) 1004 that communicate with a number of peripheral devices via a bus subsystem 1018. These peripheral devices may include input device(s) 1008, output device(s) 1006, communication network interface 1012, and a storage subsystem, such as a volatile memory 1010 and a nonvolatile memory 1014.

The volatile memory 1010 and/or the nonvolatile memory 1014 may store computer-executable instructions and thus forming logic 1022 that when applied to and executed by the processor(s) 1004 implement embodiments of the processes disclosed herein.

The input device(s) 1008 include devices and mechanisms for inputting information to the data processing system 1020. These may include a keyboard, a keypad, a touch screen incorporated into the monitor or graphical user interface 1002, audio input devices such as voice recognition systems, microphones, and other types of input devices. In various embodiments, the input device(s) 1008 may be embodied as a computer mouse, a trackball, a track pad, a joystick, wireless remote, drawing tablet, voice command system, eye tracking system, and the like. The input device(s) 1008 typically allow a user to select objects, icons, control areas, text and the like that appear on the monitor or graphical user interface 1002 via a command such as a click of a button or the like.

The output device(s) 1006 include devices and mechanisms for outputting information from the data processing system 1020. These may include the monitor or graphical user interface 1002, speakers, printers (e.g., in the case of server 204 or the client devices 206), infrared LEDs, and so on as well understood in the art.

The communication network interface 1012 provides an interface to communication networks (e.g., communication network 1016) and devices external to the data processing system 1020. The communication network interface 1012 may serve as an interface for receiving data from and transmitting data to other systems. Embodiments of the communication network interface 1012 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1012 may be coupled to the communication network 1016 via an antenna, a cable, or the like. In some embodiments, the communication network interface 1012 may be physically integrated on a circuit board of the data processing system 1020, or in some cases may be implemented in software or firmware, such as "soft modems", or the like.

The computing device 1000 may include logic that enables communications over a network using protocols such as HTTP, TCP/IP, RTP/RTSP, IPX, UDP and the like.

The volatile memory 1010 and the nonvolatile memory 1014 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1010 and the nonvolatile memory 1014 may be configured to store the basic programming and data constructs that provide the functionality of the disclosed processes and other embodiments thereof that fall within the scope of the present invention.

Logic 1022 that implements embodiments of the present invention may be stored in the volatile memory 1010 and/or the nonvolatile memory 1014. Said logic 1022 may be read from the volatile memory 1010 and/or nonvolatile memory 1014 and executed by the processor(s) 1004. The volatile memory 1010 and the nonvolatile memory 1014 may also provide a repository for storing data used by the logic 1022.

The volatile memory 1010 and the nonvolatile memory 1014 may include a number of memories including a main random access memory (RAM) for storage of instructions and data during program execution and a read only memory (ROM) in which read-only non-transitory instructions are stored. The volatile memory 1010 and the nonvolatile memory 1014 may include a file storage subsystem providing persistent (non-volatile) storage for program and data files. The volatile memory 1010 and the nonvolatile memory 1014 may include removable storage systems, such as removable flash memory.

The bus subsystem 1018 provides a mechanism for enabling the various components and subsystems of data processing system 1020 communicate with each other as intended. Although the communication network interface 1012 is depicted schematically as a single bus, some embodiments of the bus subsystem 1018 may utilize multiple distinct busses.

It will be readily apparent to one of ordinary skill in the art that the computing device 1000 may be a device such as a smartphone, a desktop computer, a laptop computer, a rack-mounted computer system, a computer server, or a tablet computer device. As commonly known in the art, the computing device 1000 may be implemented as a collection of multiple networked computing devices. Further, the computing device 1000 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s). Various embodiments have been illustrated and explained by example, but the scope of the invention is not limited to the exemplary embodiments, but is rather as set forth in the following claims.

What is claimed is:

1. A printer control system, comprising:
   a network interface to receive a first inbound communication comprising at least one of a user identity, a document identification, and a document type;
   a database that correlates one or more of the user identity, the document identification, and the document type with a hierarchy of persistent printer control settings; and
   control logic coupled to the database to:
      adapt the hierarchy of persistent printer control settings according to stored policies by disabling changes to particular printer control settings of the hierarchy of persistent printer control settings; and
      organize and communicate, in response to the first inbound communication, a network response communication, the network response communication comprising a plurality of types of graphical user interface control settings;
      wherein a first type of the graphical user interface control settings control operation of a printer associated with the hierarchy of persistent printer control settings; and
      wherein a second type of the graphical user interface control settings control a level of the first type of settings in the hierarchy of persistent printer control settings.

2. The printer control system of claim 1, further comprising:
   printer control logic to apply the first type of graphical user interface control settings to control operation of the printer.

3. The printer control system of claim 1, comprising an enterprise network computer server system.

4. The printer control system of claim 1, implemented as a cloud print service system.

5. The printer control system of claim 1, implemented as a print engine.

6. The printer control system of claim 1, wherein the hierarchy of persistent printer control settings further comprises:
   session specific printer control settings;
   printer control settings specific to individual documents;
   printer control settings specific to document types;
   printer control settings specific to location of document;
   printer control settings specific to individual users;
   printer control settings specific to teams;
   printer control settings specific to departments;
   printer control settings specific to office location;
   printer control settings specific to ad hoc categories; and
   control panel default printer control settings.

7. The printer control system of claim 1, wherein the inbound communication further comprises a document location.

8. The printer control system of claim 1, further comprising logic to respond to a second inbound communication comprising control settings of the first type and of the second type by storing the control settings of the first type from the second inbound communication in the hierarchy of persistent printer control settings, as determined by the control settings of the second type from the second inbound communication.

9. A method for controlling a printer, the method comprising:
   receiving a first inbound communication comprising one or more of a user identity, a document identification, and a document type at a network interface;
   disabling changes to particular printer control settings of a hierarchy of stored printer control settings corresponding to one or more of the user identity, the document identification, and the document type, according to stored policies;
   organizing and communicating a network response communication to the first inbound communication, the network response communication comprising a plurality of types of graphical user interface control settings;
   wherein a first type of the graphical user interface control settings are settings to control operation of the printer associated with the hierarchy of stored printer control settings;
   wherein a second type of the graphical user interface control settings control a level of the first type of settings in the hierarchy of stored printer control settings; and applying the first type of graphical user interface control settings to control the operation and output of the printer.

10. The method of claim 9, further comprising organizing the first type of the graphical user interface control settings into basic control settings and layout control settings.

11. The method of claim 9 wherein the hierarchy of persistent printer control settings comprising:
session specific printing preferences;
printer control settings specific to document types;
printer control settings specific to individual documents;
printer control settings specific to location of document;
printer control settings specific to individual users;
printer control settings specific to teams;
printer control settings specific to departments;
printer control settings specific to office location;
printer control settings specific to ad hoc categories; and
control panel default printer control settings.

12. The method of claim 9, responding to a second inbound communication comprising control settings of the first type and of the second type by storing the control settings of the first type from the second inbound communication in the hierarchy of persistent printer control settings, as determined by the control settings of the second type from the second inbound communication.

13. The method of claim 9, the inbound communication further comprising a document location.

14. The method of claim 9, further comprising:
logging the inbound communication.

15. A non-transitory machine-readable storage medium for controlling a printer, the machine-readable storage medium including instructions that when executed by a machine processor, cause the machine processor to:
associate a hierarchy of persistent printer control settings with one or more of a user identity, a document identification, and a document type;
disable changes to particular printer control settings of the hierarchy of persistent printer control settings according to stored policies; and
organize a plurality of graphical user interface control settings into an outbound network communication in response to receiving an inbound network communication comprising one or more of the user identity, the document identification, and the document type, wherein a first type of the graphical user interface control settings are settings to control operation of a printer associated with the hierarchy of persistent printer control settings, and a second type of the graphical user interface control settings control a level of the first type of settings in the hierarchy of persistent printer control settings.

16. The machine-readable storage medium of claim 15, wherein the instructions, when executed by the machine processor, further cause the machine processor to apply the first type of the graphical user interface control settings to control operation of the printer.

17. The machine-readable storage medium of claim 15, wherein the instructions, when executed by the machine processor, further cause the machine processor to organize the first type of the graphical user interface control settings into basic control settings and layout control settings.

18. The machine-readable storage medium of claim 15, wherein the hierarchy of persistent printer control settings comprise:
session specific printing preferences;
printer control settings specific to document types;
printer control settings specific to individual documents;
printer control settings specific to location of document;
printer control settings specific to individual users;
printer control settings specific to teams;
printer control settings specific to departments;
printer control settings specific to office location;
printer control settings specific to ad hoc categories; and
control panel default printer control settings.

19. The machine-readable storage medium of claim 15, wherein the instructions, when executed by the machine processor, further cause the machine processor to apply a document location when organizing the graphical user interface control settings.

* * * * *